United States Patent [19]
Ogura

[11] Patent Number: 5,945,664
[45] Date of Patent: Aug. 31, 1999

[54] IMAGE SENSOR WITH INTEGRATED ILLUMINATION, IMAGE FORMING MEANS, AND IMAGE PROCESSING APPARATUS USING THE IMAGE SENSOR

[75] Inventor: Makoto Ogura, Sagamihara, Japan

[73] Assignee: Canon Kabushiki Kaisha, Tokyo, Japan

[21] Appl. No.: 09/053,443

[22] Filed: Apr. 1, 1998

[30] Foreign Application Priority Data

Oct. 4, 1997 [JP] Japan ..................................... 9-092345

[51] Int. Cl.$^6$ ....................................................... H01J 40/14
[52] U.S. Cl. ........................................ 250/208.1; 250/239
[58] Field of Search ................................ 250/208.1, 234, 250/239, 216; 358/474, 483, 482

[56] References Cited

U.S. PATENT DOCUMENTS 5,446,276  8/1995  Iyoda et al. ........................... 250/208.1

FOREIGN PATENT DOCUMENTS 8172512  12/1994  Japan .

*Primary Examiner*—Que T. Le
*Attorney, Agent, or Firm*—Morgan & Finnegan, L.L.P.

[57] ABSTRACT

The image sensor according to the present invention comprises a photoreception unit having a plurality of photoelectric converters, illumination unit for illuminating an original, and an image forming unit for projecting reflected light reflected by the original to form an image on the photoreception unit. The illumination unit and image forming unit are fitted with each other and integrated as an optical unit. By this configuration, the illumination unit and image forming unit can be positioned with high precision, thus realizing low electrical consumption and reduced size and weight of the image sensor.

38 Claims, 5 Drawing Sheets

IMAGE SENSOR WITH INTEGRATED ILLUMINATION, IMAGE FORMING MEANS, AND IMAGE PROCESSING APPARATUS USING THE IMAGE SENSOR

BACKGROUND OF THE INVENTION

The present invention relates to an image sensor, and more particularly, to an image sensor which senses light reflected by an original sheet by utilizing photoelectric converters and generating image signals, a method of assembling the image sensor, and an image processing apparatus using the image sensor.

Conventionally, a contact-type image sensor is often used as an original-sheet reading apparatus employed by a facsimile apparatus, copying machine, scanner or the like. The contact-type image sensor projects a read image onto each sensing element on one-to-one basis by using a sensor array, and obtains an image having a size identical to the read original sheet.

The conventional contact-type image sensor comprises: a sensor chip where a plurality of elements for performing photoelectric conversion are arrayed; a sensor substrate on which the sensor chip and protection film which protects the sensor chip are mounted; illumination means for illuminating an original sheet; a rod lens array for forming an image of the original sheet onto the elements of the sensor chip; and a cover glass serving as an original-reading surface, and the foregoing components are fixed on a frame, serving as a base, by adhering, inserting, press-fitting, caulking or the like.

An example of the image sensor of this type is described with reference to the cross-section in FIG. 8 and the exploded perspective view in FIG. 9. Referring to FIGS. 8 and 9, the conventional image sensor consists of a sensor chip 1, sensor substrate 2 for mounting the sensor chip 1, rod lens array 3, illumination means 8, cover glass 5 and frame 6 serving as a base for maintaining the positions of the above components. Note that as shown in FIG. 9, the illumination means 8 comprises an LED unit 7 serving as a light source and a light guide 4.

In the illumination means 8, light emitted by the LED unit 7 and propagated inside the light guide 4 in the longitudinal direction is reflected and diffused by a reflection/diffusion portion 4a of the light guide 4, and irradiated externally, illuminating the original sheet 10. An image of the irradiated original sheet 10 is formed by the rod lens array 3, on the photoelectric converters arrayed on the sensor chip 1, and photoelectrically converted.

The image signals outputted by the sensor chip 1 are transmitted to an external circuit via a connector (not shown) provided on the sensor substrate 2.

In recent years, as the contact-type image sensor of this type is built into portable apparatuses or incorporated into printers or keyboards or the like, there is increasing demands for low electrical consumption and a reduced size and weight of the image sensor.

However, in the above-described conventional contact-type image sensor, the following problems arise in order to reduce the electrical consumption, size and weight of the image sensor.

First, to reduce electrical consumption, it is necessary to decrease the amount of electricity consumed by the illumination portion. For instance, in a case where linear illumination is provided by a smaller amount of light by using the light guide 4, the light-convergence width must be reduced to efficiently use the amount of illumination light. As a result, there are more possibilities of deviation being generated between the illumination position and original-reading position, thus giving negative influence to uniformity of sensor outputs.

Furthermore, for reducing the size and weight of the image sensor, a shorter distance (conjugate length Tc) between an original and image sensing surface of the rod lens array 3 is provided. However, by having a shorter conjugation length Tc, the amount of light provided tends to be low due to deviation in optical axes of the rod lens array 3 and sensor chip 1. As a result, non-uniformity of sensor outputs become conspicuous.

Moreover, as the size and weight of the apparatus is reduced, the rigidity of each component declines; as a result, positioning deviation is more likely to be generated due to deformation such as warp or the like of each component. Consequently, the above-described problems become more serious.

SUMMARY OF THE INVENTION

The present invention has been made in consideration of the above situation, and has as its object to provide an image sensor in which illumination means is more precisely positioned with respect to a rod lens array.

According to the present invention, the foregoing object is attained by providing an image sensor comprising: photoreception means having a plurality of photoelectric converters; illumination means for illuminating an original; and image forming means for projecting reflected light, reflected by the original which has been illuminated by the illumination means, to form an image on the photoreception means, wherein the illumination means and the image forming means are fitted with each other and integrated as one unit.

According to the present invention described above, the rod lens array and illumination means are positioned with high precision.

Another object of the present invention is to provide an image sensor in which a rod lens array and illumination means are precisely positioned with respect to a sensor substrate.

According to the present invention, the foregoing object is attained by the image sensor having the above-described configuration, which includes an optical unit having a positioning reference for the photoreception means.

According to the present invention described above, the rod lens array and illumination means are positioned with high precision with respect to the sensor substrate.

It is another object of the present invention to provide an image processing apparatus which realizes low electrical consumption, reduced size and weight of the apparatus.

According to the present invention, the foregoing object is attained by providing an image processing apparatus comprising: original-feeding means for feeding an original; reading means for reading an image from the original by an image sensor and generating an image signal; print-medium-feeding means for feeding a print medium; and image output means for outputting an image on the print medium in accordance with the image signal generated by the reading means, the image sensor in the reading means comprising: photoreception means having a plurality of photoelectric converters; illumination means for illuminating the original; and image forming means for projecting reflected light, reflected by the original which has been illuminated by the illumination means, to form an image on the photoreception means, wherein the illumination means and the image forming means are fitted with each other and integrated as one unit.

According to the present invention described above, an image sensor which realizes low electrical consumption, reduced size and weight of the image sensor, can be incorporated in the image processing apparatus.

The present invention is particularly advantageous since low electrical consumption, reduced size and weight of the image sensor are attained, and consequently, low electrical consumption, reduced size and weight of the image processing apparatus is realized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
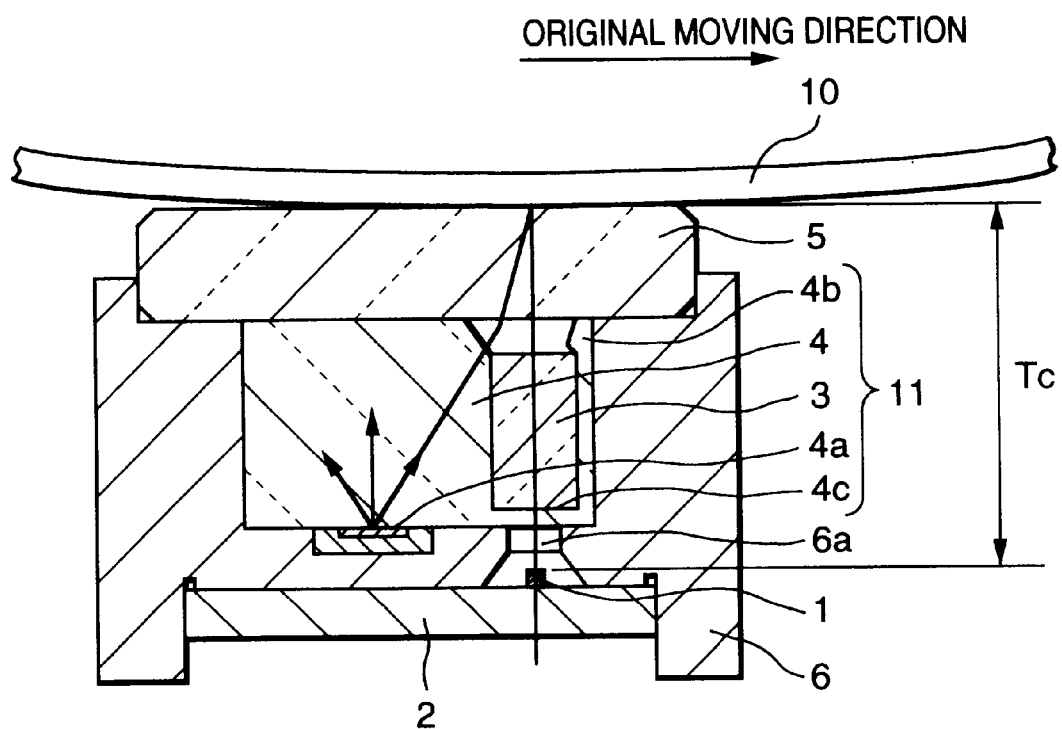
FIG. 1 is a cross-section of an image sensor according to a first embodiment of the present invention.
Figure 2:
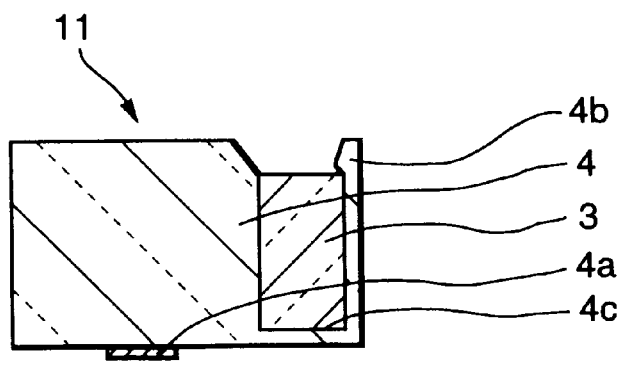
FIG. 2 is a cross-section of an optical unit utilized in the image sensor according to the first embodiment.

FIGS. 1 and 2 show cross-sections cut along the original-sheet moving direction, showing a contact-type image sensor according to the first embodiment.

The basic structure of the image sensor according to the first embodiment is substantially the same as that of the above-described conventional example. More specifically, as shown in FIG. 1, a sensor chip 1 which performs photoelectric conversion and is covered with protection film, is provided on a sensor substrate 2. On the sensor chip 1, a plurality of elements (photoelectric converters) for performing photoelectric conversion are arrayed. An image e.g. characters or graphics or the like, of an original sheet 10 is sensed and outputted to an external circuit as electric signals. Provided above the sensor chip 1 is a rod lens array 3 for forming the image of the original sheet 10 on the photoelectric converters of the sensor chip 1.

Figure 9:
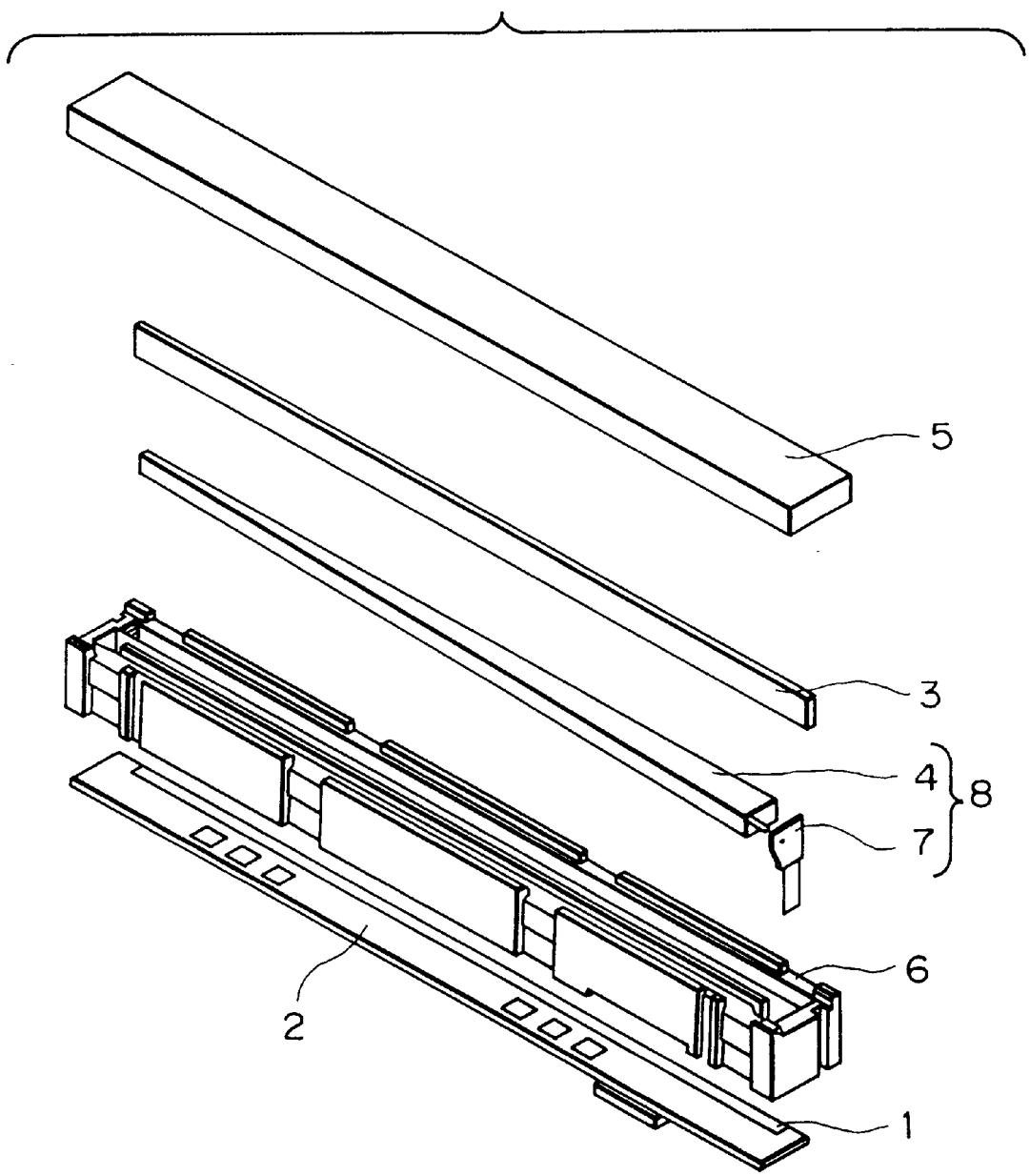
FIG. 9 is an exploded perspective view of the conventional image sensor.

A light guide 4 constructs illumination means together with a light source (not shown in FIG. 1, see LED unit 7 in FIG. 9). Light from the light source is propagated inside the light guide 4, reflected and diffused by a reflection/diffusion portion 4a formed on the bottom surface of the light guide 4, thus illuminating the original sheet 10 situated on the upper surface of the light guide 4.

Besides an LED (light-emitting diode), an electric bulb such as halogen or xenon or the like may be used for the light source. Alternately, if the image sensor comprises an LED light source having red, green and blue, and if image sensing is performed while sequentially switching R, G and B, color-image reading can be performed. Although, the light source is provided only on one side of the light guide 4 in the present embodiment, the light source may be provided on both sides of the light guide 4. Instead of the light source having R, G and B, the image sensor may comprise a light source having cyan, magenta and yellow.

The rod lens array 3 according to the first embodiment has an advantage of making a conjugation length (Tc) small for reducing the size and weight of the image sensor. The conjugation length (Tc) is the distance between the element (photoelectric converter) on the sensor chip 1 and the original-sheet reading surface. By incorporating the rod lens array 3, having a smaller conjugation length Tc, into a concave portion 4c of the light guide 4, the rod lens array 3 and light guide 4 are fitted with each other, realizing a small-size integrated optical unit 11 as shown in FIG. 2. Herein, although the rod lens array 3 is inserted in the concave portion 4c of the light guide 4 and kept in a desired position by a latch 4b of the light guide 4, the method of fixing is not particularly specified as long as the relative position of the rod lens array 3 and light guide 4 is fixed. In other words, various methods e.g., adhering, inserting, snap-fitting, caulking, press-fitting and the like, may be used. Alternately, both the rod lens array 3 and light guide 4 may be integrated and formed with the same material.

A frame 6 is a fixing material on which the aforementioned sensor substrate 2 and optical unit 11 are positioned and fixed. The sensor substrate 2 is fixed underneath the frame 6, and the optical unit 11 integrating the rod lens array 3 and light guide 4 is inserted to the frame 6 from the top, thereby being fixed. The frame 6 includes a slit 6a where luminous flux passes through from the rod lens array 3 to the sensor chip 1. Note that rod lens array 3 may be fixed to the light guide 4 after fixing the light guide 4 to the frame 6.

A cover glass 5 is fixed against the frame 6, covering the optical unit 11 integrating the rod lens array 3 and light guide 4. The upper surface of the cover glass 5 is where the moving original sheet 10 contacts; thus, the upper surface serves as the image-reading surface.

In order to actually read the original sheet 10, the original sheet 10 is conveyed by a roller or the like (not shown) in the direction indicated by the arrow shown in FIG. 1, while contacting the cover glass 5. Light supplied by the LED unit 7 (FIG. 9) propagates inside the light guide 4, then is reflected and diffused by the reflection/diffusion portion 4a, transmits through the cover glass 5 and illuminates the original sheet 10 which is moving on the upper surface of the cover glass 5.

An image e.g. characters, graphics or the like, of the irradiated original sheet 10 is formed on the photoelectric converter of the sensor chip 1 by the rod lens array 3. Then, the image data is photoelectrically converted by the sensor chip 1 and outputted to an external circuit.

As described above, according to the first embodiment, positioning of the rod lens array 3 is decided by being incorporated in the concave portion 4c of the light guide 4. Since the latch 4b of the light guide 4 engages with the rod lens array 3 to fix it, the light guide 4 and rod lens array 3 are practically integrated. In addition, by virtue of the integrated body, deformation such as warp or the like, generated in the process of molding the components, is less likely to occur than if each component is formed separately, because the integrated components reinforce and complement the body of the optical unit. Therefore, since the orientation of deformation in both components coincides in the integrated state, it is possible to realize a structure of the optical unit 11 which is less likely to receive influence of the deformation.

As has been described above, according to the present embodiment, by virtue of the configuration where the rod lens array 3 and light guide 4 are fitted with each other, the rod lens array 3 is positioned with high precision with respect to the light guide 4, and is less likely to receive influence of deformation. Accordingly, it is possible to reduce the light-convergence width of illumination light, and reduce the electrical consumption in the image sensor. Moreover, by positioning the rod lens array 3 with high precision with respect to the light guide 4, it is possible to reduce the conjugation length (Tc) of the rod lens array 3, and reduce the size and weight of the image sensor.

Furthermore, the present embodiment is applicable to a color image sensor for reading a color image, comprising an LED light source having a plurality of different peak wavelengths. In the image sensor of the present embodiment, since the precise positioning of the rod lens array 3 and light guide 4 enables to reduce the light-convergence width of illumination light, even if a conventional amount of current is applied to the LED, the efficiency in irradiating an original sheet is excellent. As a result, an increased amount of light is reflected to the original sheet, and consequently, the charge storage time of the photoelectric converters of the sensor chip 1 may be reduced. Accordingly, the problem of the conventional color image sensor, i.e. slow reading speed, can be improved.

First Modification of First Embodiment

Figure 3:
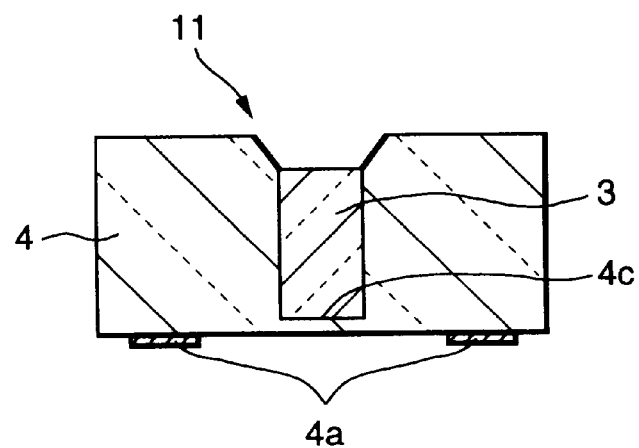
FIG. 3 is a cross-section of an optical unit utilized in an image sensor according to a first modification of the first embodiment.

FIG. 3 is a cross-section of the optical unit 11 according to a modification of the first embodiment. In this modification, the concave portion 4c is formed in the center of the light guide 4 and the rod lens array 3 is positioned therein. The reflection/diffusion portion 4a is provided on both sides of the rod lens array 3.

By virtue of the foregoing construction, the original sheet 10 can be illuminated from both sides of the optical axis of the light guide 4, while having the rod lens array 3 in the middle. Furthermore, since the light guide 4 can be formed in a symmetric shape, deformation such as warp or the like, generated in the process of molding the light guide 4 separately, is less likely to occur, and consequently deformation in the optical unit 11 can be reduced.

Second Modification of First Embodiment

Figure 4:
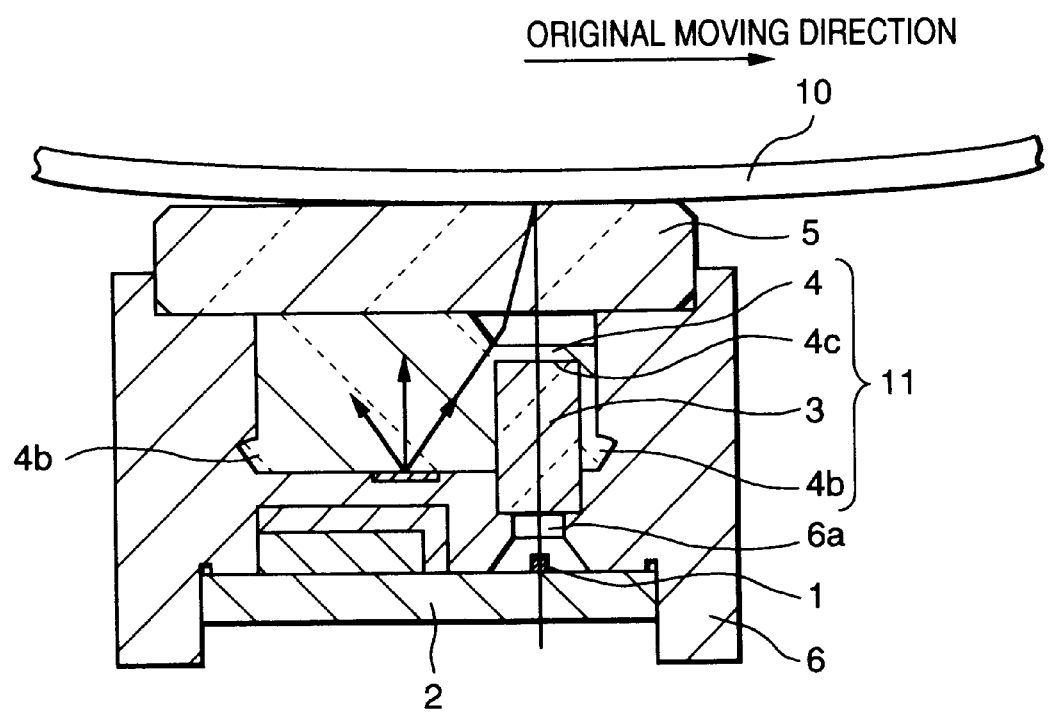
FIG. 4 is a cross-section of an image sensor according to a second modification of the first embodiment.

FIG. 4 shows another modification of the first embodiment. In this modification, the concave portion 4c used for positioning the rod lens array 3 is formed from the bottom surface of the light guide 4, i.e. from the side of the sensor substrate 2, and the light guide 4 incorporates the rod lens array 3 from the top. By utilizing the latch 4b of the light guide 4 which engages with the frame 6 as a positioning reference, the rod lens array 3 is clamped between the light guide 4 and frame 6 and fixed.

In this modification, since the rod lens array 3 is clamped by the light guide 4 and frame 6, and the latch 4b of the light guide 4 is engaged with the frame 6, it is not necessary to adhere the rod lens array 3, light guide 4 and frame 6. Accordingly, positioning precision is further improved.

Second Embodiment

Figure 5:
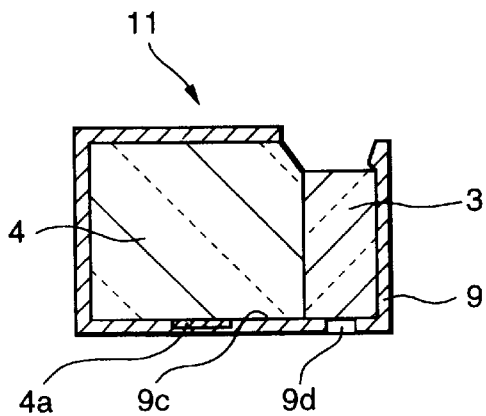
FIG. 5 is a cross-section of an optical unit utilized in the image sensor according to a second embodiment of the present invention.

The second embodiment of the present invention will be described next. FIG. 5 is a cross-section cut along the original-sheet moving direction, showing an optical unit of a contact-type image sensor according to the second embodiment of the present invention.

Each of the components in the second embodiment is basically the same as that of the first embodiment. The same reference numerals are assigned to the same components and description thereof will be omitted. The second embodiment is characterized by comprising a reflection member 9 which surrounds the rod lens array 3 and light guide 4, provided for the purpose to efficiently utilize light supplied by the light source (LED unit 7 shown in FIG. 9) without letting the light outside the light guide 4.

The reflection member 9 incorporates the rod lens array 3 and light guide 4 and constructs the integrated optical unit 11. The rod lens array 3 and light guide 4, being fitted, are clamped by the reflection member 9 and construct the integrated optical unit 11. On the bottom surface of the reflection member 9, a slit 9d is formed so as not to interfere with the luminous flux from the rod lens array 3.

An internal wall surface 9c of the reflection member 9 has a reflective surface, serving to reflect the light that emits from the light guide 4. For the reflection member 9, a metal such as aluminum, stainless steel or the like may be used, or a plastic material may be used while forming the internal wall surface 9c into a metal reflection surface by plating or deposition using silver, aluminum or the like, or white plastic molded parts may be utilized.

In the second embodiment, since the rod lens array 3 and light guide 4 are clamped by the reflection member 9 and fixed, forming the integrated optical unit, both components are positioned with high precision. In addition, by virtue of integrating the rod lens array 3 and light guide 4, the orientation of deformation, such as warp or the like, generated in the process of molding the rod lens array 3 and light guide 4 separately, coincides with each other, and it is possible to minimize the influence of the deformation added to the optical unit 11.

Modification of Second Embodiment

Figure 6:
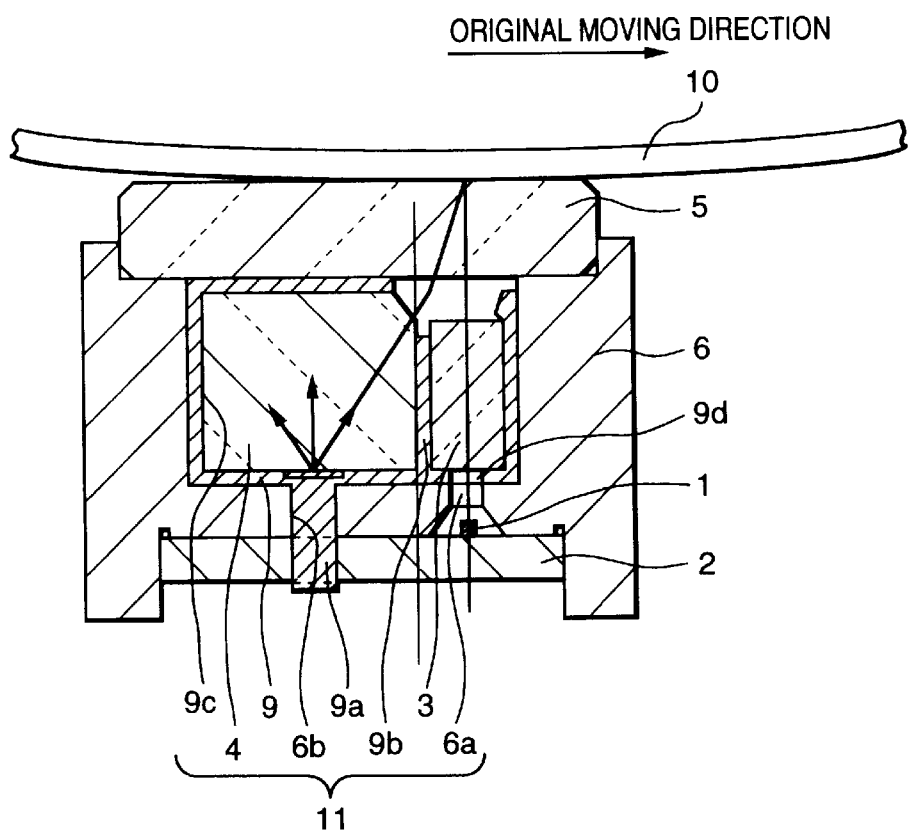
FIG. 6 is a cross-section of an image sensor according to a modification of the second embodiment.

FIG. 6 shows a modification of the second embodiment. In this modification, a positioning pin 9a, serving as a positioning reference of the frame 6 and sensor substrate 2, is provided on the bottom of the reflection member 9.

When the positioning pin 9a is inserted into a hole 6b, formed on the bottom surface of the frame 6, positioning of the reflection member 9 with respect to the frame 6 is decided. Moreover, a portion of the positioning pin 9a, which is inserted into the hole 6b and projected therefrom, is inserted also to the sensor substrate 2, positioning the sensor substrate 2. The positioning pin 9a serves not only as a mere reference, but also as fixing means such as caulking, adhering or press-fitting.

Furthermore, a wall 9b is formed in the inner portion of the reflection member 9 for reinforcing the reflection member 9. The wall 9b serves to partition the inner portion into the rod lens array 3 and light guide 4. The rod lens array 3 and light guide 4 are clamped by the reflection member 9 while having the wall 9b therebetween, thereby deciding the positioning of the rod lens array 3 and light guide 4.

In this modification, the rod lens array 3 and light guide 4 are positioned with high precision similar to the second embodiment. Also, by virtue of integrating the rod lens array 3 and light guide 4, deformation such as warp or the like, generated in the process of molding each component separately, is minimized.

Moreover, in this modification, since the positioning pin 9a of the reflection member 9, where rod lens array 3 and light guide 4 are fixed, is inserted into the frame 6 and further into the sensor substrate 2, the rod lens array 3 and light guide 4 can be precisely positioned with respect to the sensor substrate 2.

Note that the optical unit 11 in the above-described first embodiment may include a positioning reference corresponding to the positioning pin 9a of the reflection member 9, to precisely position the frame 6 and sensor substrate 2.

Third Embodiment

Hereinafter, description will be provided on an example where the image sensor according to the present invention is applied to an image processing apparatus.

Figure 7:
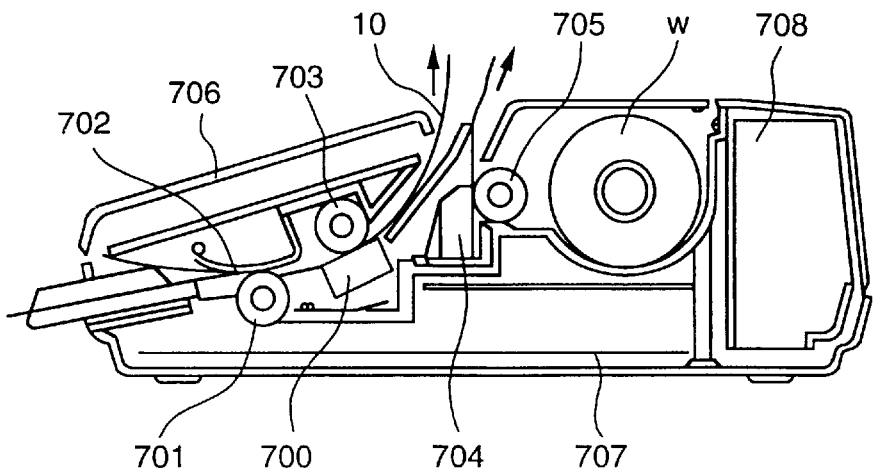
FIG. 7 is a cross-section of an image processing apparatus according to a third embodiment of the present invention.
Figure 8:
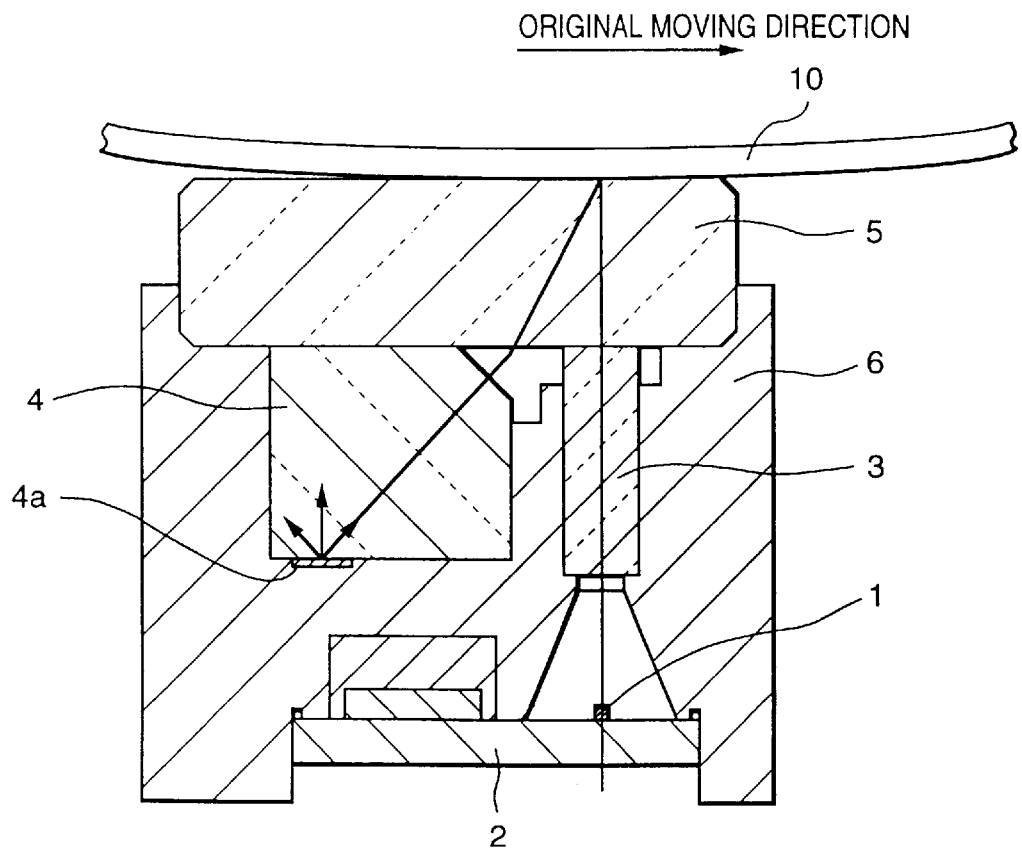
FIG. 8 is a cross-section of a conventional image sensor.

With the use of the image sensor according to the present invention, for instance, a facsimile apparatus can be realized. FIG. 7 shows a facsimile apparatus according to the third embodiment. In FIG. 7, reference numeral 701 denotes a paper-feed roller for feeding an original sheet 10 and conveying it to an original-reading position; 702, a separation claw for separating pages of original sheet 10 one by one to be separately fed; and 703, a conveyance roller provided at the original-reading position of a photoelectric conversion apparatus 700, for controlling the read surface of the original sheet 10 and conveying the original sheet 10.

The photoelectric conversion apparatus 700 comprises the image sensor described in any one of the above-described embodiments, and configures an image reading apparatus which generates image data by irradiating light on the original sheet 10 and receiving the reflected light.

Reference letter W in FIG. 7 denotes a print medium in the form of a rolled paper on which images are formed based on image data read by the photoelectric conversion apparatus 700 or image data transmitted from an external unit in case of a facsimile apparatus or the like. Reference numeral 704 denotes a printhead for performing image formation. A thermal head, a bubble-jet printhead or the like may be used. The printhead may be of a serial type or a line type.

Reference numeral 705 denotes a platen roller which conveys the print medium W to the printing position of the printhead 704 and controls the printed surface. Reference numeral 706 denotes an operation panel comprising a display or the like where operational input is performed. Reference numeral 707 denotes a system control board including a controller for controlling each portion, driver for driving the photoelectric converters, image data processor, data transmitting/receiving portion and the like. Reference numeral 708 denotes a power source.

For an information processing apparatus which can employ the present invention besides the above-described facsimile apparatus, an image scanner or the like not comprising a printhead for forming an image, but outputs read image data to a computer or network, may be used.

As set forth above, by applying the image sensor according to the present invention to an image processing apparatus, it is possible to realize low electrical consumption and reduce the size and weight of the image processing apparatus.

The present invention is not limited to the above embodiments and various changes and modifications can be made within the spirit and scope of the present invention. Therefore, to appraise the public of the scope of the present invention, the following claims are made.

What is claimed is:

1. An image sensor comprising:
   photoreception means having a plurality of photoelectric converters;
   illumination means for illuminating an original; and
   image forming means for projecting reflected light, reflected by the original which has been illuminated by said illumination means, to form an image on said photoreception means,
   in which said illumination means and said image forming means are fitted with each other and integrated as one unit.

2. The image sensor according to claim 1, wherein said image forming means is fitted with said illumination means such that the circumference of said image forming means is surrounded by said illumination means, thereby being integrated as one unit.

3. The image sensor according to claim 2, wherein said image forming means is fitted with said illumination means such that said image forming means is incorporated in a concave portion of said illumination means, thereby being integrated as one unit.

4. The image sensor according to claim 1, wherein said illumination means comprises a light source and a light guide which propagates light from the light source.

5. The image sensor according to claim 4, wherein said image forming means is incorporated in a concave portion of the light guide.

6. The image sensor according to claim 5, wherein a light-outgoing end of said image forming means is fitted with the light guide.

7. The image sensor according to claim 5, wherein a light-incoming end of said image forming means is fitted with the light guide.

8. The image sensor according to claim 4, wherein said light guide comprises a reflection/diffusion portion for reflecting and/or diffusing light from the light source.

9. The image sensor according to claim 8, wherein said light guide comprises two of said reflection/diffusion portions while having said image forming means in the middle.

10. The image sensor according to claim 9, wherein said image forming means is incorporated in a concave portion provided in the center of the light guide.

11. The image sensor according to claim 1, wherein said illumination means and said image forming means are fitted with each other and integrated as one unit, thereby constructing an optical unit.

12. The image sensor according to claim 11, wherein the optical unit has a positioning reference for said photoreception means.

13. The image sensor according to claim 12, further comprising a holder for positioning the optical unit and said photoreception means, and the optical unit has a positioning reference for the holder.

14. The image sensor according to claim 11, further comprising covering means for covering the optical unit.

15. The image sensor according to claim 14, wherein the covering means reflects light.

16. The image sensor according to claim 15, wherein an internal surface of the covering means, where the optical unit is incorporated, reflects light.

17. The image sensor according to claim 14, wherein the covering means has a slit in the side of the outgoing end of said image forming means.

18. The image sensor according to claim 14, wherein the optical unit is constructed with said illumination means and said image forming means having the covering means therebetween.

19. The image sensor according to claim 4, wherein said illumination means includes an LED (light-emitting diode) as a light source.

20. The image sensor according to claim 19, wherein said illumination means includes a plurality of LEDs having different peak wavelengths, as a light source.

21. The image sensor according to claim 1, wherein said image forming means is a rod lens array.

22. The image sensor according to claim 1, wherein said photoreception means is a sensor chip.

23. An image processing apparatus comprising:
original-feeding means for feeding an original;
reading means for reading an image from the original by an image sensor and generating an image signal;
recording-medium-feeding means for feeding a print medium; and
image output means for outputting an image on the recording medium in accordance with the image signal generated by said reading means,
said image sensor in said reading means comprising:
photoreception means having a plurality of photoelectric converters;
illumination means for illuminating the original; and
image forming means for projecting reflected light, reflected by the original which has been illuminated by said illumination means, to form an image on said photoreception means,
in which said illumination means and said image forming means are fitted with each other and integrated as one unit.

24. The image processing apparatus according to claim 23, further comprising communication means for transmitting/receiving an image signal to be supplied to said image output means.

25. An image processing apparatus comprising:
reading means for reading an image of an original by an image sensor and generating an image signal; and
signal processing means for performing predetermined signal processing on the image signal read by said reading means,
said image sensor in said reading means comprising:
photoreception means having a plurality of photoelectric converters;
illumination means for illuminating the original; and
image forming means for projecting reflected light, reflected by the original which has been illuminated by said illumination means, to form an image on said photoreception means,
in which said illumination means and said image forming means are fitted with each other and integrated as one unit.

26. The image processing apparatus according to claim 25, further comprising said control means for controlling said reading means and said signal processing means.

27. The image processing apparatus according to claim 25, further comprising moving means for moving said image sensor and/or the original relatively to each other.

28. The image processing apparatus according to claim 27, further comprising communication means for outputting the image signal, processed by said signal processing means, to an external unit.

29. The image processing apparatus according to claim 28, further comprising control means for controlling said reading means, said signal processing means, said moving means and said communication means.

30. The image processing apparatus according to claim 27, further comprising control means for controlling said reading means, said signal processing means and said moving means.

31. The image processing apparatus according to claim 25, further comprising communication means for outputting the image signal, processed by said signal processing means, to an external unit.

32. The image processing apparatus according to claim 31, further comprising control means for controlling said reading means, said signal processing means and said communication means.

33. An image processing apparatus comprising:
reading means for reading an image of an original by an image sensor and generating an image signal; and
moving means for moving said image sensor and/or the original relatively to each other,
said image sensor in said reading means comprising:
photoreception means having a plurality of photoelectric converters;
illumination means for illuminating the original; and
image forming means for projecting reflected light, reflected by the original which has been illuminated by said illumination means, to form an image on said photoreception means,
in which said illumination means and said image forming means are fitted with each other and integrated as one unit.

34. The image processing apparatus according to claim 33, further comprising control means for controlling said reading means and said moving means.

35. The image processing apparatus according to claim 33, further comprising communication means for outputting the image signal, read by said reading means, to an external unit.

36. The image processing apparatus according to claim 35, further comprising control means for controlling said reading means, said moving means and said communication means.

37. An image processing apparatus comprising:
reading means for reading an image of an original by an image sensor and generating an image signal; and
control means for controlling said reading means,
said image sensor in said reading means comprising:
photoreception means having a plurality of photoelectric converters;
illumination means for illuminating the original; and
image forming means for projecting reflected light, reflected by the original which has been illuminated by said illumination means, to form an image on said photoreception means,
in which said illumination means and said image forming means are fitted with each other and integrated as one unit.

38. The image processing apparatus according to claim 37, further comprising communication means for outputting the image signal, read by said reading means, to an external unit.

* * * * *

UNITED STATES PATENT AND TRADEMARK OFFICE
CERTIFICATE OF CORRECTION

PATENT NO. : 5,945,664
DATED : August 31, 1999
INVENTOR(S) : Makoto Ogura

It is certified that error appears in the above-identified patent and that said Letters Patent is hereby corrected as shown below:

On the title page, item:

[30] delete "Oct. 4, 1997" and insert therefor -- April 10, 1997 --.

Signed and Sealed this

Twenty-third Day of January, 2001

Attest:

Q. TODD DICKINSON

Attesting Officer

Commissioner of Patents and Trademarks